Feb. 23, 1971   I. L. YURKOWITZ   3,565,753
CAPSULE-CELLULOSE FIBER UNITS AND PRODUCTS MADE THEREWITH
Filed July 17, 1967   2 Sheets-Sheet 1
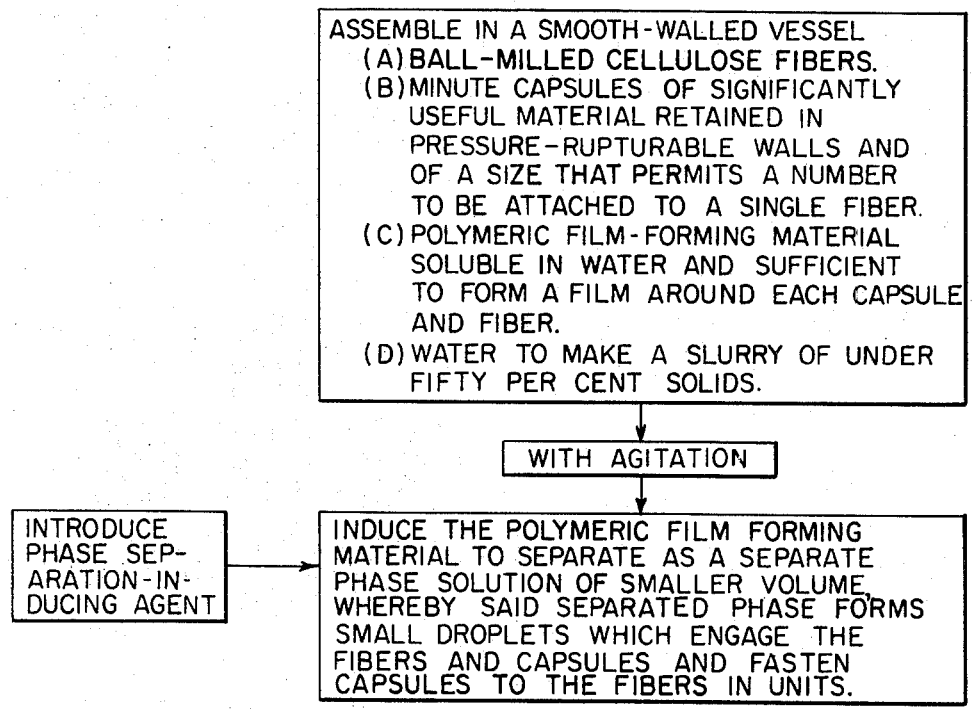
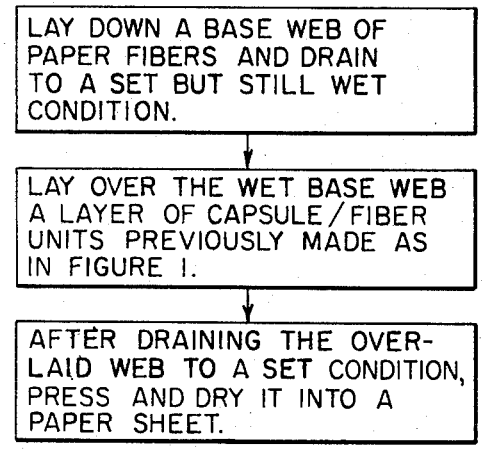
INVENTOR
ISIDORE L. YURKOWITZ
BY
HIS ATTORNEYS

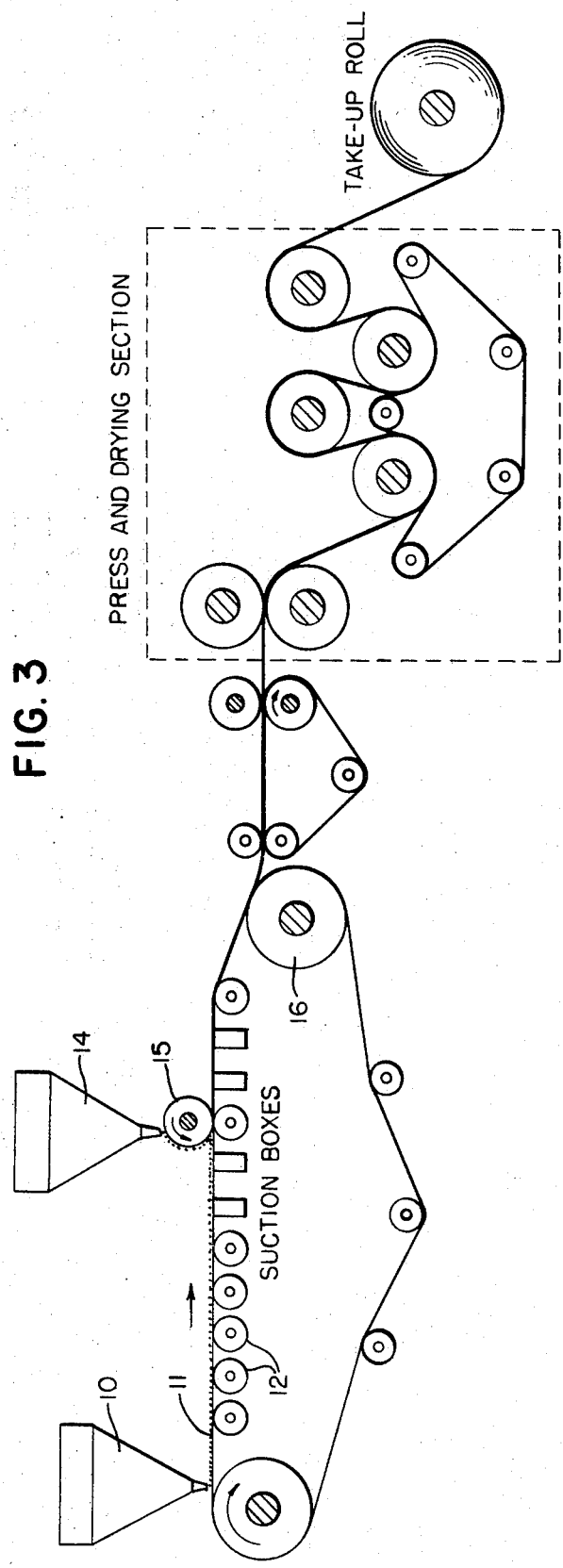

United States Patent Office 3,565,753
Patented Feb. 23, 1971

3,565,753
CAPSULE-CELLULOSE FIBER UNITS AND PRODUCTS MADE THEREWITH
Isidore L. Yurkowitz, Dayton, Ohio, assignor to The National Cash Register Company, Dayton, Ohio, a corporation of Maryland
Filed July 17, 1967, Ser. No. 653,755
Int. Cl. B32b 29/02; D21h 1/02
U.S. Cl. 162—127
20 Claims

ABSTRACT OF THE DISCLOSURE

The invention relates to the attachment of minute capsules to individual cellulose fibers to form capsule/fiber units, in an en masse process employing an aqueous polymeric material solution system with dispersed fibers and capsules and a phase separation step therein with stirring; to processes using the units; and to sheets, coatings, and molded products formed of the units.

---

The invention relates broadly to capsule/cellulose fiber units made by attaching minute capsules to cellulose fibers, individually, by an en masse process in which the capsules, of relatively minute size, are attached to cellulose fibers, in an aqueous medium, by means of a dispersed phase of film-forming polymeric material liquid solution, and to processes employing such units and products made therewith.

The units are sturdy enough to be recovered from the manufacturing medium and used in re-dispersion, if required, or used in the initial manufacturing vehicle with adjustment of the residual aqueous phase as to content.

The invention provides material means and a way to make a paper sheet having a stratum of the capsule/fiber units, the capsules containing and yielding on rupture a material of significant utility, such as a colored material, a color-reactant material, an odorous material, a medicinal material, and the like, for use in situ in the sheet where released or for transfer to another surface. In paper sheet making, the capsule/fiber units may be sufficiently large to be retained on the surface of a wet embryo base sheet of paper fibers, there to form a stratum which is bonded fiber-to-fiber with the base sheet.

The capsules in a manufacturing batch may be alike or different as to size, construction, and content, to give great adaptability of the invention in combining the attributes of different capsules in individual capsule/fiber units.

Capsule/fiber units of different batches can be blended together to obtain a composite action.

The preferred use of the capsule/fiber units is in the making of paper, to be specified, but the units may be used in a coating or extruding composition to make other than fibrous sheet material. For instance, they may be incorporated in or with textiles and yarns, incorporated in or coated on film material by coating or extrusion, or dried as units and used for any purpose where the joint attributes of fibers and capsules are desired to be integrated together. The units will undergo severe forces in agitation in a liquid without capsule failure or breaking off of the capsules from the fibers.

Individual fibers which may be in a manufacturing batch may be in lesser or greater amounts by weight with respect to capsules, and therefore the capsule/fiber units of different batches may differ as to relative numbers of capsules held on the participating fibers. The relative amounts of materials used in a batch may be adjusted accordingly.

CROSS-REFERENCE TO RELATED APPLICATION

This invention as regards the making of a paper sheet is related to U.S. Pat. No. 3,384,536, issued May 21, 1968 on application of Robert W. Sandberg, Bruce W. Brockett, and Donald B. Clark. In the Sandberg et al. process, capsules are not bonded to cellulose paper fibers until the capsules are brought into contact with a moving web of fibers on a paper-making machine, and no separate capsule/fiber units are formed in that disclosure. On the contrary, in this invention, the capsule/fiber bonding is carried out before application to an embryo wet paper sheet.

BRIEF SUMMARY OF THE INVENTION

In addition to providing capsule/fiber units consisting of individual cellulose fibers having capsules of minute size bonded thereto with polymeric material, this invention relates to making paper and paper products, wherein the product has the capsule/fiber units built into the product in accurately supplied numbers and placement in the sheet as selectively controlled. The capsule/fiber units are applied to a wet embryo paper sheet in a hand sheet mold or to a wet embryo paper sheet in transit in a continuous sheet paper machine after draining to a set condition, but before pressing, so that the fiber of the capsule/fiber units, as far as possible, mingle at the wet surface of the base sheet and form a true stratum of the sheet.

After selectively predetermining how thick a stratum of the capsule/fiber units should be built into the final sheet, a division of the total fiber content of the sheet is determined and a division made as to what amount shall be applied as a base ply and what shall be applied as a component of the capsule/fiber units. In a Fourdrinier paper-making machine, the base sheet fibers are furnished from the head box to form a primary non-capsule base ply, and what is the capsule/fiber unit portion should be applied down-screen from the head box as a second application of fibers bearing the capsules to form a secondary ply. As the fibers of the capsule/fiber units have the capsules clinging thereto firmly like buds if the capsules are relatively small with respect to the fibers, the units, because of their size, which is determinable, cannot penetrate into the wet base sheet to which they are applied more than just enough to be integrated at the resultant fiber-to-fiber interface. The capsules clinging to the fibers create units of such dimension that said units cannot pass into the partially-drained and set fiber web already in position on the screen. Therefore the final sheet will have the capsule/fiber units therein only to a thickness which is proportional to the amount of fibers used plus the capsules.

The art of the invention in making the capsule/fiber units, in one practical form, is to disperse the fibers which are to have the capsules attached thereto, in an aqueous medium which is supplied with a polymeric component material which has an electric charge of one polarity—for example, a cationic charge—and thereafter dispersing the desired proportion of capsules of selected size and content into the fiber dispersion and thoroughly mixing them together. To attach the capsules to the fibers, an oppositely-charged polymeric material adapted to complex with the cationically-charged material is introduced into the stirring dispersion, which promptly results in the formation of a separate liquid phase of the complex in liquid solution state, but richer in polymeric material than the original solution. This rich polymeric material solution phase in dispersion constitutes a coacervate. The capsules, if smaller than the fibers, upon the formation of a separating liquid phase of complex polymeric material, become attached along the fibers as in the manner of buds or as clusters. It is thought that the amorphous parts of the fibers are more receptive to capsules than the crystalline areas.

One of the important contributions of this invention is that, by using very short cellulose fibers, minute capsules may be attached to the fibers as densely as a 1-to-1, ratio. Capsules having dimensions larger with respect to the fibers seem to have the fibers clinging to them, but the total effect in either situation is to have units of capsule/fiber construction of a size which in a sense is self-limiting in microscopic units as a result of the degree of agitation and wetting forces involved. These units in the process of paper making having an overlying definite stratum of capsule/fiber units are large enough not to fall into the interstitial spaces between the "set" wet fibers of the base ply to which the units are applied. The ratio of capsules to fibers used in forming the units may vary, so that more or less capsules are bonded to the fibers. Wholly crystalline areas of the fibers seem not to hold capsules or the polymeric material solution.

This invention provides absolute control in making a paper sheet with respect to the numerical population density of capsules in the capsule/fiber unit stratum, and as to the depth of deposition of capsule/fiber units, because the relative amounts of capsules to fibers may be selectively chosen before application to the base sheet, and the ratio maintained. Because the process of this invention, in its preferred form for making paper, is practiced at the wet end of a paper-making machine, the sheet is apparently fully integrated, but the plies can be microscopically identified in cross-section. A sheet of paper made by the practice of this invention may be as fully integrated to the eye as any sheet of paper that has been formed by application of fibers from two head boxes arranged in tandem. On the outer hand, the fibers associated with the capsules may differ from those used for the base web in constitution or color.

Pressure-sensitive mark-forming sheet material systems having marking material retained in pressure-rupturable capsules generally have two forms; namely, the "autogenous" form, wherein all of the necessary mark-forming components are present in a single sheet in contiguous juxtaposition to each other, and the "transfer" form, which utilizes two or more sheets wherein one or more of the mark-forming components physically move from one sheet to another sheet. In the "transfer" form, the sheet with capsules is generally considered as the transfer sheet and is supplied with the minute capsules containing the significant materials, and said other sheet is commonly referred to as the receiving sheet, said receiving sheet, if necessary, containing one or more mark-forming components to help produce a mark on the receiving sheet.

"Two-sidedness"—that is to say, where one side differs from the other—is particularly useful in record material sensitive so as to yield a liquid in response to pressure, since the liquid mark-producing material may be confined so as to issue on one side thereof to produce a more commercially acceptable product. In paper of the "autogenous" type, "two-sidedness" and the retention of mark-forming material in a ply adjacent one surface provide that, for given marking conditions, a smaller amount of mark-forming material may suffice than would be required when the mark-forming material is incorporated and issued throughout the thickness of the record material, since it is only those marks which are adjacent the surface which can be seen from the outside of the record material, and those marks which are formed deep down in the body of the sheet are not necessary and even are undesirable. In the case of the "transfer" type, the "two-sidedness" and the retention of the mark-forming material adjacent one surface enable a more efficient transfer of the mark-forming material from the surface than would be possible if the same amount of mark-forming material were issued and distributed throughout the thickness of the sheet record material. In both types of record material, therefore, the retention of the mark-forming material adjacent one surface of the record material in a predetermined depth requires less mark-forming material to be used to produce commercially acceptable records than when the mark-forming material is dispersed throughout the record material, and thus enables a saving to be effected in the manufacturing of such record material. Moreover, in the usual case where minute capsules are used, at least one of the mark-forming components is present as the potentially mobile internal contents of the capsules (said capsules being used in large quantities numerically), so that, upon application of pressure to the sheet material, the corresponding "pressed" capsules are ruptured, and, in the case of "autogenous" sheet material, the capsule contents are released to coact with the other mark-forming components disposed within said sheet to produce a mark. In the case of the "transfer" system, the capsule contents are released to transfer or move from the transfer sheet to a receiving sheet for forming marks on the receiving sheet. In both instances, a mark is formed according to a pressure pattern.

While liquid contents of capsules and release of it by pressure have been discussed, material may be used which passes through the capsule walls on being heated as by a hot stylus. Materials of the phenolic resin type which yield a gas on being heated may pass through capsule walls of gelatin, for instance, and such capsule contents and capsule use are included as a known use at this time. Wherever pressure-sensitive conditions are mentioned, hot-type printing should be thought of as equivalent if the capsule contents are so responsive.

By "pressure-sensitive mark-forming sheet material," or similar phraseology, is meant that type of sheet material which, upon the application of mark-forming pressure thereto (for example, pressure of a stylus, a type face such as that carried by a typewriter slug, raised type printing plates, or the like) and without any intervening agency such as a ribbon, carbon, ink, or marking impression sheet, or other agency, other than the sheet material itself, the configuration of the area receiving the pressure is reproduced on the sheet material as a visible, distinctive mark by mark-forming components in the material itself.

Sheet materials embodying minute capsules are described in U.S. Letters Pats. Nos. 2,730,456 and 2,730,457, issued Jan. 10, 1956, on applications of Barrett K. Green and Lowell Schleicher, and assigned to the assignee herein, and have proven commercially successful and have been the practiced art in what is often referred to as the "carbonless carbon-paper system" field of business forms. In said patents, pressure-rupturable microcapsules containing one of the mark-forming components are coated onto a sheet material, such as finished paper, to provide, as the case may be, either an "autogenous" sheet material or a "transfer" sheet material. Said sheet material, in the instance of the "autogenous" system, also contains at least one other reactive mark-forming component, so that, upon application of marking pressure to the system, a mark is produced on the sheet bearing the capsules. In the case of the "transfer" sheet, marking pressures release liquid to be transferred to an underlying sheet. In the prior systems referred to above, coating of fibrous sheet material, such as finished paper, with the capsules results in a substantial portion of the capsules being disposed on the surface of the sheet, though a minor and significant portion of the capsules migrates within the sheet material. Having the capsules on the surface of the sheet renders the sheet material hypersensitive to forces having a vector parallel to the plane of the sheet, and thus to a degree subject to undesirable smudging. Further, the capsular surface imparts a certain degree of roughness to the "hand" of the sheet relative to a smooth finish obtainable with an uncoated sheet. Moreover, the presence of the capsules on the surface produces a moderate amount of pick-up of the capsules by printing mechanisms during overprinting operations on said sheet material.

This invention is distinguished from capsule-containing coatings containing a filler of cellulose fibers, as disclosed in U.S. Pat. No. 2,711,375, which issued on the application of Robert W. Sandberg on June 21, 1955, because in that invention there is no bonding of capsules to individual cellulose fibers to make capsule/fiber units of a size to prevent entry as whole units into the sheet of paper.

This invention provides a paper sheet different from a laminate sheet having a ply or stratum in which capsules are mechanically trapped in the pores made by interlaced fibers of cellulose, as there no bonding of capsules to fibers in units exists, and there is nothing tethering the capsules in place.

This invention, in one form, comprises a system of capsule/cellulose fiber units and the product produced therefrom for applying to a wet sheet in transit on a paper machine whereby to control exactly and predetermine secondary stock application, said secondary stock being laid upon and comingled with a wet and draining, but "set," web of plain paper fibers.

The "two-sidedness" of the product of this invention is independent of the presence of one or more other kinds of capsules or other particles throughout the thickness of the sheet or on the outside of the sheet, and it does not preclude the presence of other material, particulate or other, present in, on the outside of, or otherwise associated with, the sheet, to cooperate, or not, with the set of capsules positioned in the sheet by the practice of this invention. There may be two or more kinds of capsules in the sheet, one of which is bound to the special fibers and which brings about the "two-sidedness" by its distribution from one side towards the center, and the other of which is confined or not confined to the other side, or spread throughout the thickness of the sheet but has no bonding to the fibers.

This invention provides a novel sheet which combines the advantages of "two-sidedness" and of capsule physical protection from touch and sight found in sheets where such are distributed throughout the thickness of the sheet or applied to a surface thereof. The capsules attached to the individual fibers to make the best units for paper ply use should be much smaller in their average diameter size than the sheet thickness and preferably are of such size, and present in such quantity, that they are protected in the interstitial spaces between the capsule/fiber units of the ply formed from the secondary stock.

It is within the concept of the use of the capsule/fiber units in paper making, as a second ply substance, to have large capsules that protrude from the surface in the dry state of the paper yet are intimately bound to the sheet, yet are available for release of contents by scraping or rubbing the sheet surface, as would be desirable in the release of perfume, cleaning agents, medicines, and the like. In this case, the capsules can be much larger than the fibers, which latter may then be said to be bonded to the capsules. This relative size relation between fibers and capsules bonded thereto is one of the variant conditions to which the invention is adapted.

It is contemplated that the embedded capsules need not be of uniform substance, content, and size. The capsules may be a mixture as to size and capsule wall material, and /or of different content or origin, to serve one or more utilitarian purposes in behavior. The capsules may be mixtures, so the components have walls of different resistance to rupture or fracture, and may be different in content or behavior otherwise.

The instant invention provides a precisely controlled deposition of a secondary ply of cellulose fibers having capsules attached thereto and protuberant therefrom upon a primary wet and draining, but "set," web of paper fibers. The secondary ply is formed from fibers bound to microcapsules by a relatively viscous phase of binder material, which phase wets both microcapsules and fibers, bonding them together and somewhat providing an encompassing sheath. The relatively viscous phase of binder material comprises the film-forming polymeric material which has been induced to separate as such from a relatively low-concentration solution thereof by introducing into a slurry of fibers and microcapsules one of known "change of condition" agents, whether such agents be of chemical and/or physical nature, to cause said separation.

By introducing capsules and fibers into the phase separation system, wherein polymeric materials of opposite electric charge coact in solution in a vehicle under appropriate conditions to cause the generation and emergence of a relatively viscous solution of the polymeric materials as a separate liquid phase which may be stirred into a discontinuous state, it has been found that adhesion of microcapsules, each having as its internal contents a mark-forming component dissolved in an oil, onto the fibers in a liquid slurry can be effected. Thus, upon contact of polymer molecules of one charge and polymer molecules of opposite charge, a relatively viscous liquid solution phase separates, which, being capable of wetting the capsules and the fibers, binds the capsules to the fibers so wetted, and the agitation keeps the capsule/fiber entities from merging.

In general, any known technique for effecting a phase separation of a viscous liquid polymeric material phase from a continuous phase is satisfactory. Equally effective is the establishment of such a two-phase liquid system by judicious selection of materials of polymeric and solvent components. An establishment of a two-phase liquid system is disclosed in U.S. Pat. No. 3,436,355, issued Apr. 1, 1969 on application of Joseph A. Bakan. Essentially, the system may be characterized as comprising three mutually incompatible phases; (a) a continuous liquid vehicle; (b) a discontinuous phase of a multiplicity of microcapsules; and (c) a discontinuous phase of mobile entities of film-forming polymeric material dispersed in the liquid vehicle and having microcapsules dispersed therewith, and said entities of polymeric material binding microcapsules to fibers if present.

To obtain disuniformity among capsules, they may be manufactured in separate batches according to the desired characteristics of the capsules as to origin, size, contents, or wall material and structure, and thereafter blended in the desired proportions for bonding onto the fibers in the manufacturing vehicle. This is important where more than one kind of capsule contents (solid or fluid) is to be made use of either by rupture of the capsules or by their characteristics in the unruptured state. It is within the province of this invention to provide capsules having different thicknesses of walls or different strengths of walls, to the end that they may be differentially fractured by variations in pressure, so that some capsules may be ruptured by one pressure and the rupture of other capsules will follow in response to application of a greater pressure.

In a preferred embodiment of this invention as relates to paper-making, cellulose fibers ball-milled to dimensions of 20 to 50 microns are bonded to capsules by the novel process. Various other cellulose fibers may be employed as capsule-free plies or capsule-bearing plies; for example, as a capsule-free primary ply. Eligible capsule-bearing or non-capsule-bearing fibers that can be reduced in size include natural cellulosic fibers such as fibers yielded by hard and soft tree woods and woody plants like Manila hemp, jute, caroa, sisal, kozu, rye, wheat, oats, barley, rice, ramie, cane, and corn-stalk fibers, etc. The paper-makers' materials unbleached sulfite pulp, semi-bleached sulfite pulp, fully bleached sulfite pulp, unbleached semi-chemical pulp, semi-bleached semi-chemical pulp, caustic cooked chestnut fiber, unbleached soda pulp, semi-bleached soda pulp, fully bleached soda pulp, unbleached and cooked cotton rag stock, bleached and cooked cotton rag stock, cooked begasse fibers, cotton linter pulp of various types and grades, mechanical pulp from both coniferous and deciduous woods, and other bast fiber stock, old paper stock made up of any or all or any mixture of used paper-making fibers, and, in fact, any cellulosic fibrous material that lends itself to the formation of units useful in making cellulosic webs or forms webs from an aqueous suspension are eligible starting materials.

Among the synthetic fibers which may be used as auxiliary plies or which may be used to augment natural fibers in non-capsule-bearing plies are polyacrylic fibers, polyester fibers, or polyamide fibers.

Suitable capsular materials containing mark-forming components are described in the above-mentioned U.S. Pats. Nos. 2,730,456 and 2,730,457.

FIG. 1 of the drawings is a flow sheet showing the making of the fiber/capsule units.

FIG. 2 of the drawings is a flow diagram of how the novel sheet material is made.

FIG. 3 of the drawings illustrates a manufacturing apparatus suitable for carrying out the subject invention, more particularly the manufacture of pressure-responsive mark-forming sheet material on a Fourdrinier paper machine. The figure is a schematic diagram showing the various components of the Fourdrinier paper machine, and apparatus for introducing the materials used in the practice of this invention.

In FIG. 3, the headbox 10 contains an aqueous slurry of primary stock paper pulp to form a primary ply. The aqueous slurry is passed onto the Fourdrinier wire 11 moving in the direction of the arrow. Table rolls 12 and suction boxes are shown. A secondary headbox 14 contains additional fiber material (secondary stock), said additional fiber material (secondary stock) having minute capsules bonded to individual fibers. The secondary stock is added to a "set" ply (primary stock) formed on the Fourdrinier wire 11. The secondary headbox may be placed after the dandy roll 15. After leaving the wire 11 at the couch roll 16, the two-sided web passes through the press and drying sections of the machine and onto a take-up roll.

It should be understood that the foregoing description is merely illustrative. It is within the scope of this invention to add the secondary stock with capsules bonded thereto by means other than the dandy roll or at the dandy roll station—that is, at any point in the web formation—provided that the web, at the time of addition of the secondary stock having the microcapsules adherent thereto, is sufficiently wet and draining to permit commingling of the primary and secondary plies.

EXAMPLE 1

The making of cellulose fiber/capsule units

The preferred embodiment of this aspect of the invention requires the use of mechanically milled (dry) hardwood pulp fiber that has been reduced to a largest dimension of 35 to 50 microns, leaving a crystalline structure as low as 55%. With this material, it has been found that equal parts, by weight, of minute liquid (oil)-containing capsules of about 15 up to 25 micron cluster size (smaller capsules tend to form botryoid clusters) and under—down to single capsules of 1 to 2 microns in largest dimension—can be successfully attached to the fibers in an aqueous system comprising a vehicle and dispersed contents having the following composition:

| Ingredients | Parts by wt. |
|---|---|
| Cellulose (hardwood) fiber reduced by dry ball-milling to 55% crystallinity and average largest dimension of 35 microns | 1 |
| Minute capsules having walls of approximately a 1:1 complex of gelatin and gum arabic and containing chlorinated diphenyl oil (48% chlorine content) in an amount of 95% oil, by weight, and a cluster dimension of up to 15 to 25 microns | 1 |
| Polymeric material (cationic) soluble in water and subject to complexing into an emergent liquid phase (polyethyleneimine) | 0.05 |
| Water | 18.00 |
| Phase-separation-inducing agent material (anionic) polyvinylmethylether maleic anhydride | 0.005 |

The last ingredient is added after the rest have been dispersed, with vigorous agitation, to form the cellulose fiber/capsule units forthwith. These units hold the capsules so tightly that the most vigorous agitation in an electric blender cup will not cause them to disintegrate. In such condition, the slurry of units so produced is ready to be applied to a wet paper web.

The "units" made by this method are not uniform in size and may vary from single fibers and attached capsules to aggregates in which a plurality of fibers are involved together with their attached capsules and some capsules are enveloped in the polymeric material that cannot be identified as being associated with a particular fiber, but generally the units are of microscopic dimension but larger than the pores in a wet paper web of 95% water content.

The high weight ratio of capsules to fibers in these units permits a net 3-pound content of capsules in a 30-pound ream of paper to require a ply of capsule/fiber units of one-fifth of the paper thickness when finished. If only a net one-pound coating of capsule/fiber units is required, then only one-fifteenth of the paper sheet in thickness is required, and so on. The fibers used in the capsule/fiber units of this example have not enough length to make a very strong sheet by themselves, but the free parts of them mingle with the wet base web fibers (and fibrils) to allow for physical interlock, which firmly binds the plies together at the interface and gives the capsule stratum support. The units are bound to each other by contact interlock to form a fabric structure that is thoroughly integrated as a part of the whole sheet.

In making a hand sheet, the first ply furnish is poured into the mold and drained to about 95% water content, followed by the slurry of capsule/fiber units of the selected amount and water content. After draining and pressing, the sheet may be lightly calendered to give it a finish.

EXAMPLE 2

A second preferred example of the invention is that aspect relating to paper making wherein there is applied to a wet base sheet web of paper fibers in transit on the screen of a Fourdrinier machine at a point where the water content of the sheet is 95%, or less, a slurry of the capsule/fiber units of Example 1 in an amount of 10%, by weight, solids content (fibers plus capsules), so that the dried sheet capsule weight is about three pounds per ream of 500 sheets 25 inches by 38 inches, and the capsule ply contains about the same weight of dry fiber. This sheet may be lightly calendered, as the capsules are somewhat protected by the associated fibers.

Other examples of making capsule/fiber units

| Ingredients: | Parts by wt. |
|---|---|
| (I) Cellulose fiber | |
| 35 microns | 4.0 |
| Water | 200.0 |
| Dry capsules | 4.0 |
| Polyethyleneimine | 0.2 |
| Polyvinylmethylether maleic anhydride slightly acidified with acetic acid | 0.02 |

The cationically charged polyethyleneimine is stirred with the first three components, and the last ingredient then is added as a water solution. Cellulose fibers of paper-making quality and unbeaten will hold about one part of the four parts of capsules specified. Fibers which have been physically reduced in size to about 100 microns by dry ball-milling will hold about two parts of the four, and fibers of in-between size would have a relative holding power. Fibers of 35 to 50 microns will hold all of the four parts of capsules.

(II) The example of I wherein there is substituted for all or part of the polyethyleneimine a similar amount of cationic starch.

(III) The example of I wherein there is substituted for all or part of the polyvinylmethylether maleic anhydride an equal amount of ammonia treated Karaya gum.

(IV) The example of III wherein guar gum is used in place of ammonia treated Karaya gum.

(V) The example of III wherein polyacrylamide is used in place of ammonia treated Karaya gum.

(VI) The example of III wherein locust bean gum is used in place of ammonia treated Karaya gum.

(VIIa) The composition of I in which the capsules have walls derived from hydrophilic polymeric material such as gelatin/gum arabic complex.

(VIIb) The composition of I modified by the capsules' having walls of ethyl cellulose.

(VIII) The composition of I wherein the capsules are a mixture of those having walls of gelatin/gum arabic and those having ethyl cellulose walls.

(IX) The composition of I wherein the capsules contain marking material in liquid form taken from the group consisting of colorless color reactants, dyes, pigments, and liquid-suspended pigments.

(X) The composition of I wherein the capsules contain significant material or suspensions in liquid of significant materials that affect any one of the physiological senses or can be detected by non-physiological sensors.

Other ways of making a paper sheet (XI) As indicated, many types of fibers are useful in making sheet material, that do not hold the requisite number of capsules to qualify for pressure-sensitive record material forms. In such instances, longer fibrillated paper fibers may be used with success to make the capsule/fiber units in a slurry that has not the population density of capsules, as indicated in the preferred embodiment. In cases where the ordinary paper-makers' fibers are used, it is suggested that about one fourth of the capsules used proportionally to the figures given in Example 2 be used, unless an excess of unbound capsules is desired.

(XII) The record sheet of Example 2 may be modified to yield an autogenous sheet of record material by dividing the capsules into two portions, one half of the capsules holding one of two reactants which produce color on contact—for instance, crystal violet lactone in solution—and the other half of the capsules holding the co-reactant—for instance, p-phenyl phenol in solution—and introducing these capsules into the system as a mixture.

Other uses of the capsule/fiber units

The novel capsule/fiber units may be used in the slurry form at the end of the manufacturing process to coat on any surface, porous or not, and the surface may be that of any material, sheet-like or otherwise, that will receive the coating.

The manufactured units may be press-dried into blocks in which an intimate mixture of capsules and fibers are present in juxtaposition for any purposeful use, such as:

(1) Capsule protection;
(2) Release of fluid (liquid) on pressure applied to the mass;
(3) To create a reaction in the mass by pressure, where the capsules are a mixture of those having reactive components which are co-reactant when brought together;
(4) Where long-lasting emergence of capsule contents is desired by intermittent or long-lasting capsule-rupturing forces are applied.

The manufactured units may be extruded along with binder material or not, or with other material to make a composite mass to which the capsule/fiber units contribute by their physical shape, surface condition, or reaction to applied forces.

There are many cationic polymeric materials commercially available under trade names, among which is tertiary amine of corn starch.

What is claimed is:

1. A method of making a fibrous sheet of paper characterized by having one side different from the other, said one side being identified and characterized by a stratum of micro-capsules extending from the surface of said one side into the sheet, comprising the steps of
   (a) laying down onto a sheet-supporting screen a water slurry of paper fibers equal in amount to make that portion of the sheet which does not include the capsules;
   (b) before the slurry of step (a) has been completely drained of water, but after it has set, applying thereto an aqueous vehicle slurry of water and fibers which have attached thereto microcapsules containing material intended to be released by their rupture, said micro-capsules being randomly attached to the individual fibers singly and in clusters to form units of the micro-capsules and fibers, the total amount of fibers of the aqueous slurry of step (b) and attached micro-capsules minus the aqueous vehicle making up the capsule-bearing portion of the sheet, the bulk of the micro-capsule/fiber units preventing penetration of them into the layer of fibers of the slurry of step (a) to an extent that substantially no micro-capsule/fiber units will pass through the draining fibers of the slurry of step (a) and
   (c) drying the fibrous sheet.

2. A method of making a paper sheet including the steps of
   (a) laying down on a screen, to drain, a paper fiber aqueous slurry, sufficient to form a base web, and
   (b) while the base web is still draining but set, laying down over it an aqueous slurry composition comprising, as dispersed entities, cellulose fibers of distinctive small dimensional range having adherent to individual fibers, by means of polymeric film material a number of micro-capsules to form micro-capsule/fiber units, said micro-capsule/fiber units because of their aggregate size being unable to fall through the web of step (a) but because of the wet conditions becoming a part of the web by interlocking at the interface; and
   (c) drying the sheet.

3. The process of claim 2 wherein said polymeric material comprises a positively-charged polymer and a negatively-charged polymer which complex to form a liquid phase, envelops the micro capsules, and simultaneously adheres to cellulose fibers, thereby to affix the micro-capsules to the fibers.

4. A pressure-sensitive mark-forming sheet of material comprising a first ply of fibers and, in intimate and contiguous relationship with said first ply, a second ply of fibers having a multiplicity of pressure-rupturable micro-capsules each containing a mark-forming material as an inner phase, bonded to said fibers of the second ply individually in a closely-adherent, bud-like attitude by a polymeric material.

5. The pressure-sensitive mark-forming sheet of claim 4 wherein said polymeric material consists of oppositely charged polymeric materials brought together in a complex in the presence of the associated fibers.

6. The pressure-sensitive mark-forming sheet of claim 4 wherein said polymeric material comprises ammonia-treated Karaya gum and cationic starch.

7. The pressure-sensitive sheet of claim 4 wherein said polymeric material is a complex of polyethyleneimine and polyvinylmethylethermaleic anhydride.

8. A process of making micro-capsule/cellulose fiber units comprising micro-capsules attached by polymeric film-forming material to individual cellulose fibers, comprising the steps of
   (a) dispersing an amount of micro-capsules in water in which is dissolved film-forming polymeric material that can be made immiscible in the water so as to separate as a liquid phase by altering the conditions of the solution;
   (b) stirring the desired amount of the fibers into the dispersion; and (c) changing the conditions of the solution with stirring to cause emergence of the liquid phase as a dispersion of droplets which wrap around and bind the microcapsules to the fibers which on continued stirring form small units of fibers and capsules.

9. A process for making micro-capsule/fiber units comprising the steps of
  (a) providing a slurry comprising water, film-forming polymeric material dissolved in the water, cellulose fibers of a quality useful in paper-making, and water-dispersible micro-capsules in an amount, by weight, as great as the weight of the cellulose fiber; and
  (b) changing the condition of the slurry to make the polymeric material less soluble in the water, said change in conditions being accompanied by stirring, whereby a separate liquid phase of rich polymeric material solution emerges, is dispersed in the slurry as droplets, and binds individual fibers and microcapsules together to make micro-capsule/fiber units.

10. The process of claim 9 in which the cellulose fibers are selected from dry ball-milled cellulose fibers of from 20 to 35 microns in largest dimension.

11. The process of claim 9 in which the polymeric material in solution is polyethyleneimine.

12. The process of claim 9 in which the polymeric material in solution is starch.

13. The process of claim 9 in which the polymeric material in solution is tertiary amine of corn starch.

14. The process of claim 9 wherein the polymer-rich phase emergence is brought about by the addition of polyvinylmethylethermaleic anhydride to the slurry of step (a).

15. The process of claim 9 wherein the change in condition is achieved by introducing ammonia-treated Karaya gum to the slurry of step (a).

16. The process of claim 9 wherein the polymer-rich phase emergence is brought about by the addition of locust bean gum to the slurry of step (a).

17. The process of claim 9 wherein the film-forming polymeric material has a cationic charge when dissolved in the slurry.

18. The process of claim 9 wherein the polymer-rich phase emergence is brought about by the addition to the slurry of step (a) a material which has an anionic charge.

19. The process of claim 9 wherein the film-forming polymeric material has one electric charge and the change in condition of the slurry of step (a) is brought about by the addition to said slurry of a material which has an opposite electric charge.

20. A process for making units of minute size consisting of cellulose fibers having securely attached thereto, by polymeric material, one or more micro-capsules, comprising the steps of
  (a) selecting relative amounts of fibers and microcapsules in a range, by dry weight, to form a mix of from 1 part micro-capsules to 4 parts fiber to 1 part micro-capsules to 1 part fiber;
  (b) by agitation, dispersing the selected micro-capsules and fibers in a water solution of film-forming polymeric material;
  (c) and, by introducing a material into the dispersion of step (b), causing the polymeric material to coacervate and emerge from a residual water phase as a separate lesser volume of solution richer in polymer and dispersible in the residual water, and continuing agitation to cause droplets of emergent coacervate to bond the micro-capsules to the cellulose fibers.

References Cited

UNITED STATES PATENTS

| | | | |
|---|---|---|---|
| 2,077,015 | 5/1937 | Schacht | 162—125 |
| 2,711,375 | 6/1955 | Sandberg | 117—36.2 |
| 2,730,456 | 1/1956 | Green et al. | 117—36.1 |
| 3,015,604 | 1/1962 | Hochberg | 162—157 |
| 3,041,288 | 6/1962 | Anthony | 162—158X |
| 3,137,631 | 6/1964 | Soloway | 162—158X |
| 3,384,536 | 5/1968 | Sandberg et al. | 162—157X |

S. LEON BASHORE, Primary Examiner

F. FREI, Assistant Examiner

U.S. Cl. X.R.

117—36.2; 162—130, 149, 158, 162, 168, 175, 178; 252—316